US008828129B2

(12) United States Patent
Volo et al.

(10) Patent No.: US 8,828,129 B2
(45) Date of Patent: *Sep. 9, 2014

(54) TWO-STAGE AIR FILTER AND MASK INCORPORATING THE SAME

(76) Inventors: Giovanni D. Volo, Meriden, CT (US); Salvatore R. Carabetta, Meriden, CT (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/464,143

(22) Filed: May 4, 2012

(65) Prior Publication Data

US 2012/0216814 A1    Aug. 30, 2012

Related U.S. Application Data

(63) Continuation of application No. 12/461,270, filed on Aug. 5, 2009, now Pat. No. 8,182,568, which is a continuation-in-part of application No. 11/785,871, filed on Apr. 20, 2007, now abandoned.

(60) Provisional application No. 60/794,849, filed on Apr. 26, 2006.

(51) Int. Cl.
*B01D 50/00* (2006.01)
*B01D 46/00* (2006.01)
*B01D 46/12* (2006.01)

(52) U.S. Cl.
CPC ............ *B01D 46/12* (2013.01); *B01D 46/0023* (2013.01); *B01D 2275/305* (2013.01); *B01D 46/0028* (2013.01); *B01D 46/0038* (2013.01)
USPC ................... 96/222; 55/485; 55/486; 55/501; 55/511; 128/206.19; 422/124

(58) Field of Classification Search
USPC .................... 422/124; 55/485, 486, 501, 511; 128/206.19; 96/222
See application file for complete search history.

(56) References Cited

U.S. PATENT DOCUMENTS 8,182,568 B2 * 5/2012 Volo et al. ........................ 55/485

OTHER PUBLICATIONS

The prior art submitted and cited in parent U.S. Appl. No. 12/461,270, filed May 22, 2010, the priority of which is claimed in the current application.

* cited by examiner

*Primary Examiner* — Robert A Hopkins
(74) *Attorney, Agent, or Firm* — Richard C Litman

(57) ABSTRACT

The two-stage air filter is formed of a nonwoven glass fiber first or inlet filter element and a second or outlet filter element formed of nonwoven fiber. The outlet filter element is preferably formed of either polyester material, or a blend of polyester and cotton fiber material. The first or inlet filter element is coarser than the second or outlet filter element, with the first element serving to capture larger particles while allowing smaller particles to pass therethrough to be captured by the finer second filter element. The two filter elements have a continuous and unbroken, homogeneous interface therebetween, with the attachment of the two filter elements with one another being solely at their mutual peripheries by a peripheral frame. Additional air freshening and cleaning, deodorizing, odor neutralizing, scent applying, fungicidal, bactericidal, and/or germicidal chemicals or materials may be applied to either or both filter elements.

8 Claims, 4 Drawing Sheets

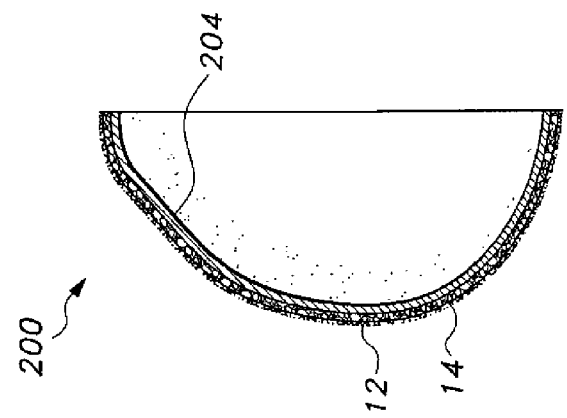
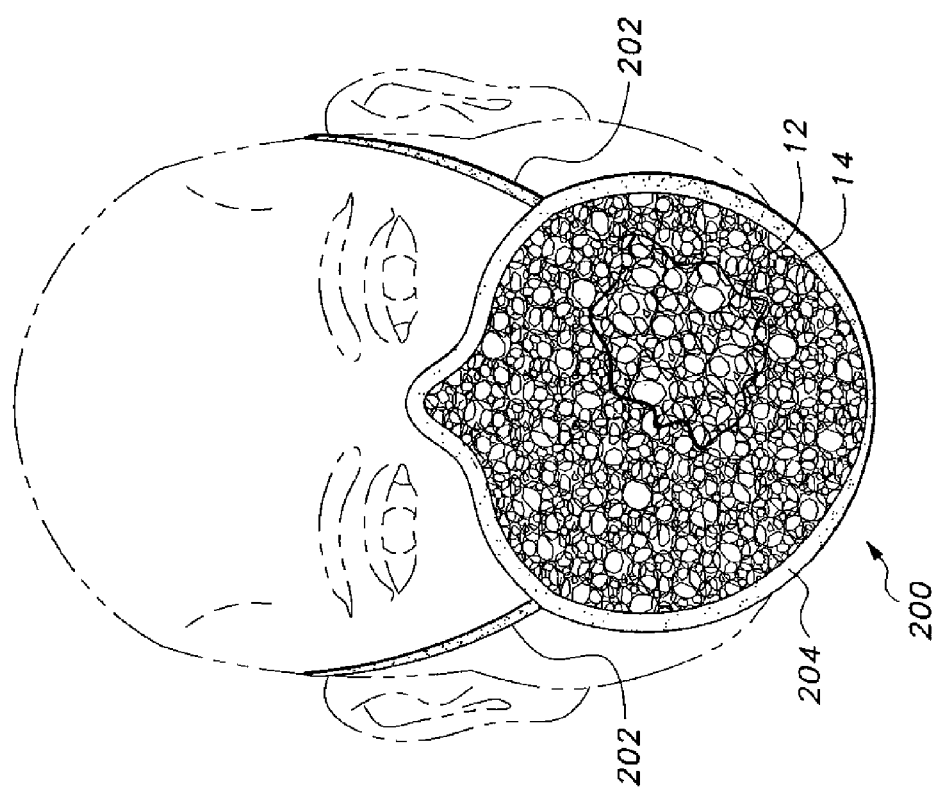
Fig. 5
Fig. 4

TWO-STAGE AIR FILTER AND MASK INCORPORATING THE SAME

CROSS-REFERENCE TO RELATED APPLICATION

This application is a continuation of U.S. patent application Ser. No. 12/461,270, now U.S. Pat. No. 8,182,568, which is a continuation-in-part application of U.S. patent application Ser. No. 11/785,871, filed on Apr. 20, 2007, abandoned, which claimed the benefit of U.S. Provisional Patent Application Ser. No. 60/794,849, filed Apr. 26, 2006.

BACKGROUND OF THE INVENTION

1. Field of the Invention

The present invention relates generally to air filters for stationary heating, ventilation, and air conditioning (HVAC) systems, as well as filters used in internal combustion engine induction systems, motor vehicle HVAC systems, and similar environments, and further to surgical and other filtering type masks incorporating air filters.

2. Description of the Related Art

Air filters of various configurations have been developed for use with forced air circulation heating, ventilation, and air conditioning (HVAC) systems in stationary structures, such as homes and office buildings, as well as for use in internal combustion engine induction systems and mobile vehicle HVAC systems. Such filters provide many benefits in prolonging the life of equipment by filtering out contaminants that might otherwise damage delicate parts having close tolerances, as well as making life more comfortable for persons in the filtered air environment.

Such filters have generally been formed of a single filter material or element for the sake of economy. Such single stage or element filters are less costly to manufacture than a multiple stage or multiple element filter, as the step of assembling two or more filter elements together is not required. However, such single stage filters are generally not as efficient as multiple stage filters, as the single homogeneous filter element must be selected to filter the smallest particles, which may damage the system or affect personnel within the HVAC environment. This generally requires relatively fine filtration, which is not necessarily compatible with a filter element selected for use in a relatively dirty or dusty environment. Very fine filter elements in such dirty environments become clogged in relatively short order, while a more coarse filter element allows finer particles through the filter to contaminate the system.

Accordingly, various filters having multiple filter elements have been developed in the past. Such multiple filter elements generally provide a relatively coarse filter element to the inlet side of the filter, and a finer filter element to the outlet side of the filter. In this manner, the finer filter element is not contaminated with coarser particles and tends to capture only the finer particles passing through the system.

An example of such a dual element filter is found in Japanese Patent No. 55-99,315 published on Jul. 29, 1980. According to the drawings and English abstract, this filter comprises a relatively coarser first layer intermittently bonded to a finer second layer across the span of both elements. The filter of the '315 Japanese Patent Publication also uses the same thermoplastic filter material for both of the filter elements, rather than different materials for the two elements.

Another example of a multiple element air filter is illustrated in Japanese Patent Publication No. 64-43,323 published on Feb. 15, 1989. According to the drawings and English abstract, this filter bonds an unspecified nonwoven fabric material to a paper filter material.

Thus, a two-stage air filter solving the aforementioned problems is desired.

SUMMARY OF THE INVENTION

The two-stage, surgical air filter has a first or inlet pad or layer of porous, nonwoven glass fiber material and a second or outlet pad or layer of a nonwoven synthetic fiber material, e.g., polyester. The polyester material may include a natural fiber, e.g., cotton, mixed or blended therewith. Preferably, the glass fiber material is of a somewhat coarser gauge than the polyester material in order to filter out relatively larger contaminants before they reach the polyester filter at the outlet side of the device. A filter element retainer or "blow-out" screen or the like may be installed across the outlet side of the polyester outlet filter. The two-stage air filter may also include one or more additives in the form of air freshening and cleaning, deodorizing, odor neutralizing, scented, fungicidal, bactericidal, and/or germicidal chemicals or materials therein, with such additives preferably being applied across the entire span of the filter assembly. Alternatively, additives which merely apply a scent to the air being drawn through the filter may be applied across only a portion of the cross-sectional area of the filter.

The present invention also extends to a method of assembling such a two-stage air filter. Rather than applying adhesive or other means for securing the two filter elements across their mutually adjacent and contacting faces, the two filter elements of the two-stage air filter are secured together only along their mutual peripheries by the installation of the border or frame thereto. Thus, only a single step is required for the assembly of the two-stage air filter, with the added benefit that filtration is not impeded by additional adhesive or mechanical fasteners disposed between the two filter elements in the airflow path.

Alternatively, the two-stage air filter may be incorporated into a surgical mask or any other suitable breathing apparatus providing filtered air for the user. An outer, filter material layer is provided, as is conventionally known. The outer, filter material layer is formed from porous fabric or the like of the type commonly used in surgical masks.

The outlet surface of the outlet side filter layer is positioned against the inner face of the outer, filter material layer. The outlet side filter layer may be attached to the inner face of the outer, filter material layer by any suitable type of attachment, such as stitching, adhesives, glue, bonding or the like. The inlet side filter layer and the outlet side filter layer each have a mutually contiguous periphery and an adjacent filter layer contact face, forming a continuous, unbroken, homogeneous contact interface therebetween. The inlet side filter layer is attached to the outlet side filter layer via any suitable type of attachment. Additionally, the mask includes straps or the like for securing the mask to the user's face in a conventional manner.

These and other features of the present invention will become readily apparent upon further review of the following specification and drawings.

BRIEF DESCRIPTION OF THE DRAWINGS

FIG. 4 is an environmental front view of a surgical mask incorporating the two-stage air filter according to the present invention, broken away to show details thereof.

FIG. 5 is a side view in section of the mask of FIG. 4.

Similar reference characters denote corresponding features consistently throughout the attached drawings.

DETAILED DESCRIPTION OF THE PREFERRED EMBODIMENTS

The present invention comprises various embodiments of a two-stage air filter having two filter elements formed of different materials in order to optimize the filtration process. The two-stage filter may be configured for use in virtually any environment where air filtration is required, e.g., stationary structures and motor vehicles having forced air heating, ventilating, and air conditioning (HVAC) systems, internal combustion engine induction systems, etc. Alternatively, the two-stage air filter may be incorporated into a surgical mask or any other suitable breathing apparatus providing filtered air for the user.

Figure 1:
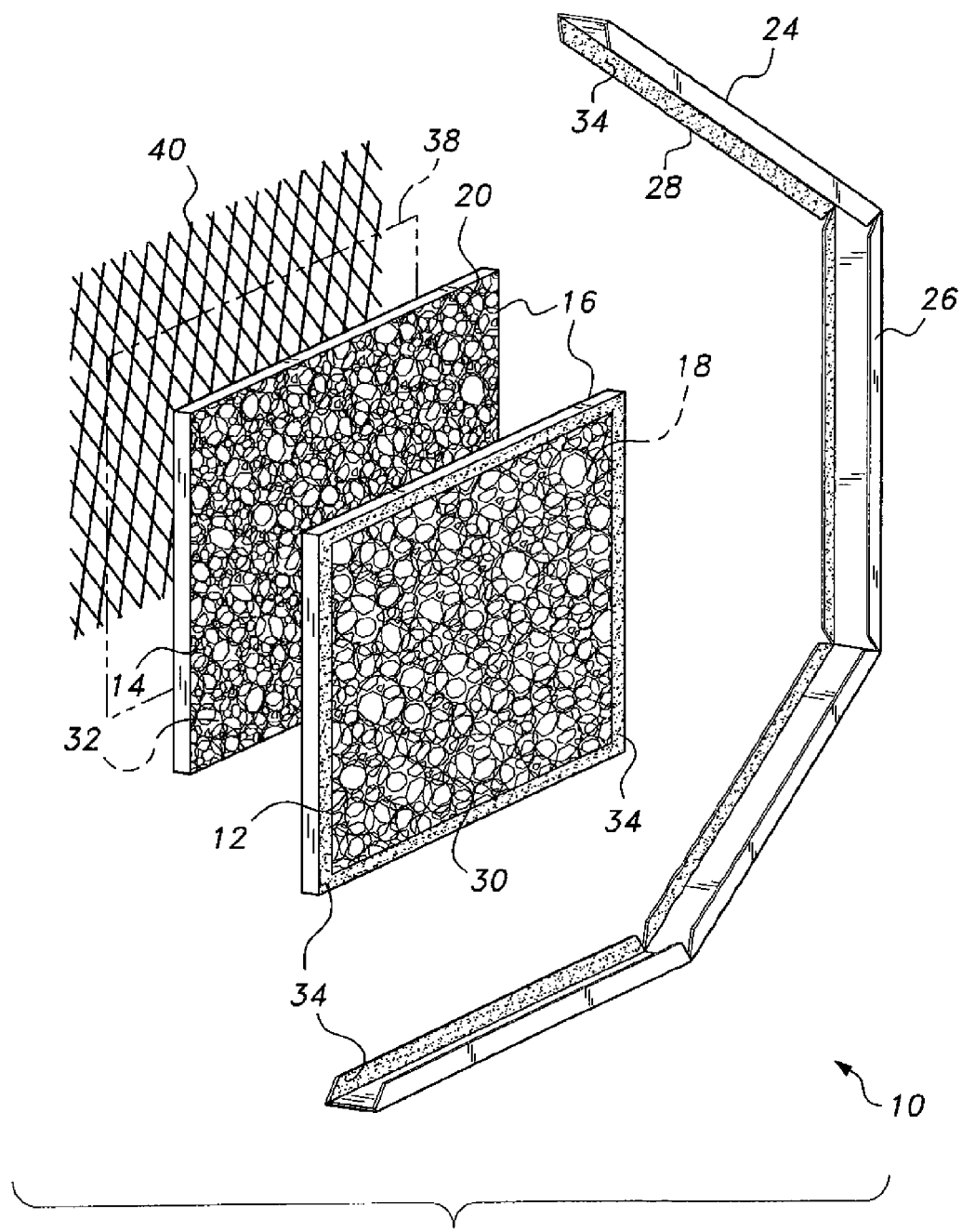
FIG. 1 is an exploded perspective view of a two-stage surgical air filter according to the present invention, showing the relationship between components.
Figure 2:
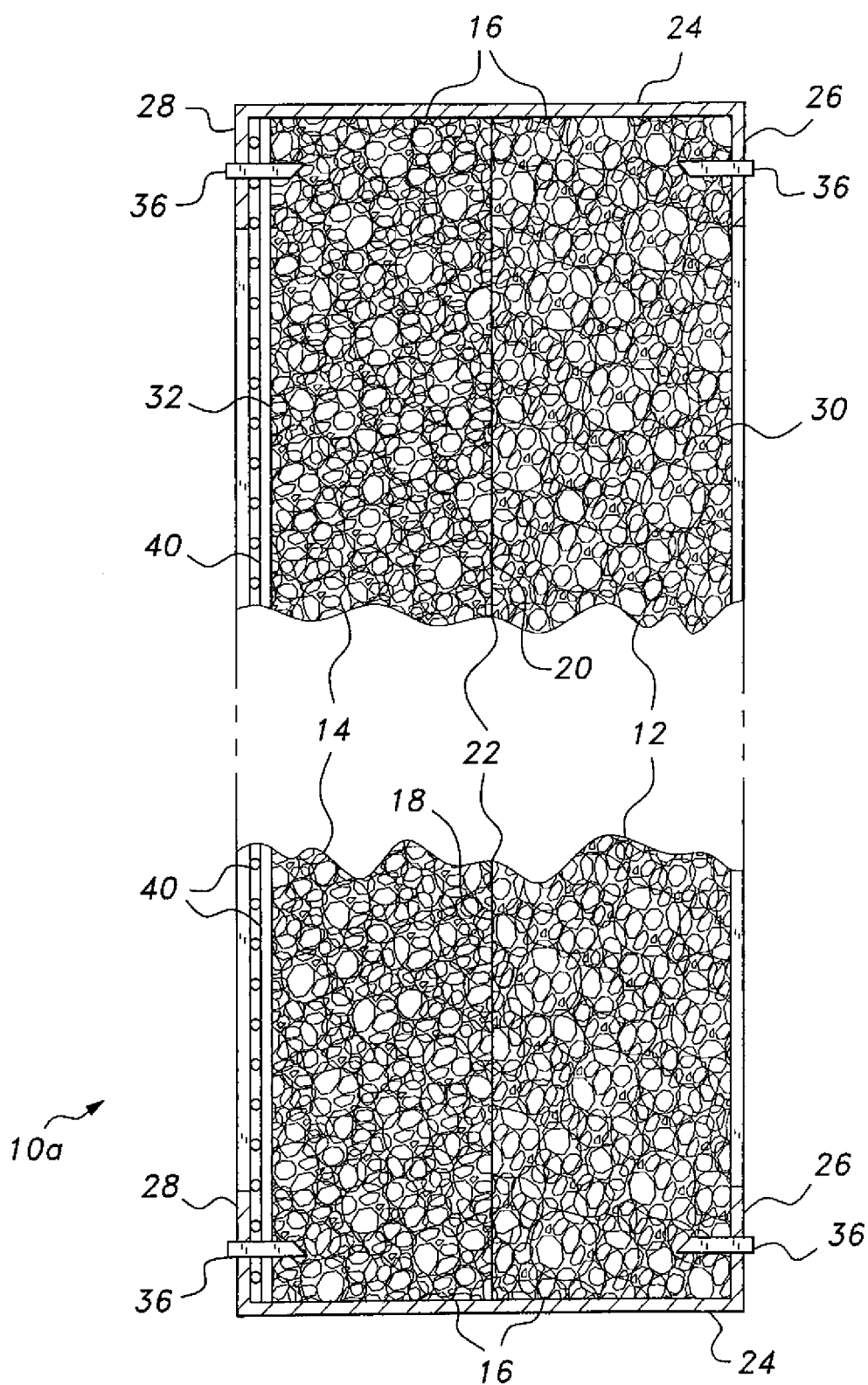
FIG. 2 is a detailed partial side elevation view in section of another embodiment of the two-stage air filter assembly, showing various details of its construction.

FIG. 1 provides an exploded perspective view of a first embodiment of the two-stage filter assembly 10, illustrating the various components thereof, with FIG. 2 providing a side elevation view in section of a slightly modified filter assembly 10a. The filter assemblies 10 and 10a each include a first or inlet side filter element 12 formed of nonwoven glass fiber material, and a second or outlet side filter element 14 formed of nonwoven fibrous material. The second or outlet side filter 14 may be formed of a polyester fiber material, or may include cotton fiber mixed with the polyester to form a polyester/cotton blend. The second or outlet side filter element 14 is configured with a finer gauge than the first or inlet side filter element 12, with the inlet side filter element 12 (this is the return side, in a recirculating HVAC system) serving to capture relatively larger particles to preclude the blockage of the second filter element 14 by such larger particles, while allowing smaller particles to pass through the coarser gauge first filter element 12 to be captured by the second or outlet side filter element 14.

The two filter elements 12 and 14 are of essentially identical size and shape to one another (within the range of manufacturing tolerances), and have mutually contiguous peripheries 16 when placed or assembled together. Each element 12 and 14 is a relatively flat and thin sheet of porous nonwoven fiber material, with the two elements 12 and 14 being placed with their mutually facing filter element contact faces 18 and 20 immediately adjacent with one another and in mutual contact to form a continuous, unbroken, homogeneous contact interface 22 therebetween, as shown in FIG. 2. However, the interface 22 between the two filter elements 12 and 14 is devoid of any form of filter element attachment means. In this manner, airflow through the two filter elements 12 and 14 is optimized, as there is no attachment means, adhesive, or other obstruction(s) between the two filter elements which would otherwise impede airflow therethrough.

Rather than securing the two filter elements 12 and 14 directly to one another, a peripheral frame 24 is provided that serves to hold the two elements 12 and 14 together, as well as serving as a rigid or semi-rigid frame to hold the assembly in place within the filter housing or plenum as required. The frame 24 may be formed of a variety of materials, e.g., a heavy paper or thin cardboard, a thin plastic sheet, a light gauge of sheet metal, etc. The frame 24 includes a relatively narrow inlet side peripheral flange 26 and an opposite outlet side peripheral flange 28 of about the same width as the inlet side flange 26, with the peripheral flanges 26 and 28 securing to the respective inlet and outlet surfaces 30 and 32 of the inlet and outlet side filter elements 12 and 14 along the peripheries thereof. The only difference between the two filter assemblies 10 and 10a of FIGS. 1 and 2 is that in the embodiment 10 of FIG. 1 the frame 24 is secured to the edges of the filter elements 12 and 14 by an adhesive 34 applied to the inner surfaces of the flanges 26 and 28 and/or to the inlet and outlet surfaces 30 and 32 adjacent the peripheries 16 of the two filter elements 12 and 14. The two-stage filter 10a of FIG. 2 differs only in that the frame 24 is secured to the two filter elements 12 and 14 by staples 36, or by any other suitable means of attachment, such as glue, adhesives, bonding or the like. It should be understood that any suitable type of frame or alternative retainer may be utilized, and frame 24 is shown for exemplary purposes only in the Figures.

Either of the two filter embodiments 10 and/or 10a may optionally include some means for treating the air which passes therethrough. Such air treatment may be in the form of air freshening and cleaning, deodorizing, odor neutralizing, scent applying, fungicidal, bactericidal, and germicidal materials (such materials as charcoal), as desired. These materials are conventional and may be applied to a portion of, or to the entire span of, either or both filter elements 12 and/or 14. In the case of fungicidal, bactericidal, and/or germicidal agents, such materials are preferably applied across the entire span or cross-sectional area or surface of the filter assembly 10 or 10a in order to treat all of the air passing through the filter assembly. However, where only a scent additive material is to be added, such additive may be applied to only a portion of the cross-sectional area of the filter assembly, as the scented air will mix with other unscented air downstream of the outlet side of the assembly after the scent treated and untreated air has passed therethrough.

Rather than treating the filter element(s) 12 and/or 14 directly with such air treatment agents, a separate porous sheet 38 impregnated with the desired air treatment agent(s) may be placed across the outlet surface 32 of the outlet side filter element 14. The air treatment material sheet 38 is shown in broken lines in FIG. 1 of the drawings, as it is an optional component that may be omitted, e.g., for internal combustion engine air filtration systems, etc., and is shown sandwiched between outlet side filter element 14 and retainer 40. In addition to retainer 40, which is positioned against the outlet side, a second similar retainer may be added on the inlet side, with the filtering material being sandwiched therebetween in a secure manner. Such a porous air treatment material sheet 38 may be formed to have a similar configuration to a clothes dryer air freshener sheet or the like, or other form. Again, the chemicals, materials, and/or agents applied to the sheet 38 are conventional and known in the art, and need not be described in further detail herein. For surgical or hygienic purposes, sheet 38 is preferably formed from a material similar to that used in surgical masks and conventional surgical filtering systems.

Air filters are universally subjected to a pressure differential as air flows through the filter elements, with lower pressure to the outlet side 32 of the filter assembly. Accordingly, a filter element retainer 40 in the form of a screen, expanded metal guard, open weave mesh, etc., may be provided across the outlet surface 32 of the outlet side filter 14. The filter element retainer 40 has a periphery coinciding with the peripheries of the inlet and outlet side filter elements 12 and 14, with the retainer 40 in turn being retained by the outlet side peripheral flange 28 of the frame 24 when the various components are assembled to form the completed filter 10 or 10a. The filter element retainer 40 may be omitted where relatively low airflow, and thus little pressure drop across the filter assembly, occurs. In the above, it should be understood that the inlet/outlet air flow described with relation to air filters 10 and 10a may be reversed, without departing from the spirit or scope of the invention as claimed. Additionally, although shown as being a stand-alone filter, it should be understood that air filter 10 or air filter 10a may be added to a pre-existing, conventional air filter, preferably fitting the present surgical air filter over the outlet of the conventional air filter. Air filter 10 or 10a may be slid or connected to the external air filter by any suitable type of releasable attachment. Additionally, though shown as having a planar configuration, it should be understood that the surgical air filter may have alternative contouring, such as an accordion or bellows-type structure, for example, allowing for an increase in overall surface area.

Figure 3:
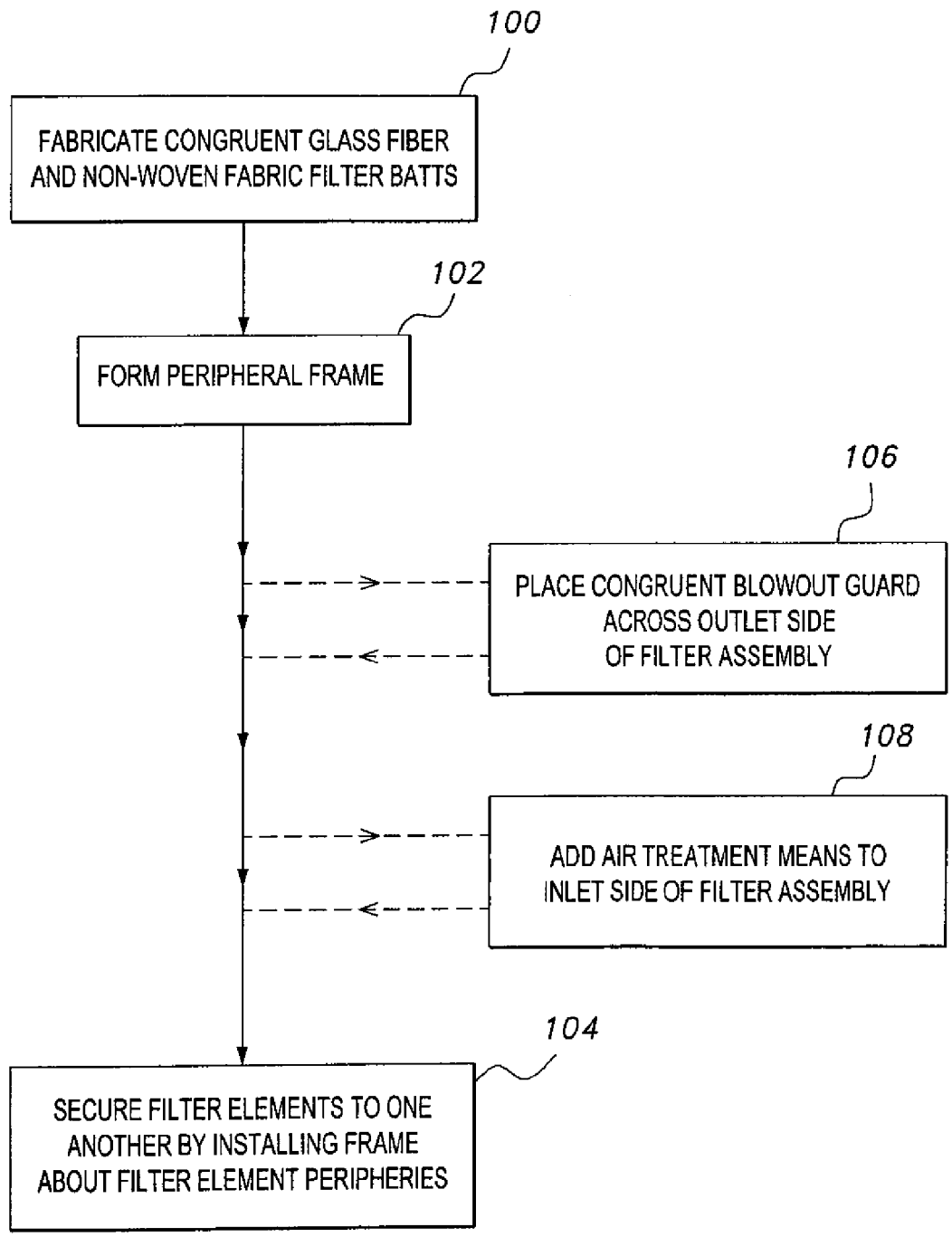
FIG. 3 is a flowchart describing the general steps in the method of construction of a two-stage air filter according to the present invention.

FIG. 3 provides a flowchart describing the basic steps in the method of constructing a two-stage air filter in accordance with the present invention. Initially, two separate air filter elements are formed as described further above, with the first or inlet side filter element being formed of nonwoven glass fiber material and the second or outlet side filter element being formed of nonwoven polyester fiber or a polyester and cotton fiber blend. The first or inlet filter element of glass fiber has a somewhat coarser gauge than the second or outlet side filter element, in order to capture larger particles before they reach the second filter element. The two filter elements or batts are cut or otherwise formed to have about the same size and shape so as to be mutually congruent when placed atop one another. This initial fabrication step is indicated as step 100 in the flowchart of FIG. 3.

A peripheral frame is formed for the filter assembly, as indicated by the second step 102 of FIG. 3. The frame may be formed of a variety of thin sheet materials, e.g., stiff or heavy paper, thin cardboard, plastic, thin sheet metal (aluminum or steel, etc.).

The two filter elements are secured together in a mutually congruent, face-to-face relationship with one another by assembling or installing and securing the frame about their mutual peripheries, generally as shown in the third step 104 of FIG. 3. The frame may be adhesively secured to the peripheries of the two filter elements, generally as indicated in FIG. 1 of the drawings, or may be mechanically attached to the two filter elements, as indicated in the embodiment of FIG. 2. In both cases, the step 104 of securing the frame about the peripheries of the filter elements also serves to secure the filter elements to one another, with there being no other structure or means attaching the two filter elements to one another across their mutually contacting faces. This optimizes the airflow through the filters, as there is no intervening filter attachment structure spanning the airflow path through or between the filters to reduce the airflow therethrough.

The above-described two-stage air filter assembly may be modified during the assembly process by installing an outlet side filter element retainer simultaneously with the installation of the frame to the two filter elements, if so desired. This optional step is indicated as step 106 in the flowchart of FIG. 3. The filter element retainer or "blowout guard" may be formed of a variety of porous or foraminous materials to allow airflow therethrough, e.g., expanded metal, wire screen, or various open mesh materials, as desired. The filter retainer or blowout guard is retained by the outlet side peripheral flange of the frame, generally as shown in FIGS. 1 and 2 of the drawings.

It is also possible to include a number of different air treatment means or materials with the two-stage air filter, as noted further above. This optional step is indicated as step 108 in the filter manufacturing or assembly steps of FIG. 3. One or more such air treatment materials, including, but not limited to, air freshening and cleaning, deodorizing, odor neutralizing, scent applying, fungicidal, bactericidal, and germicidal materials in any combination. Preferably, fungicidal, bactericidal, and germicidal agents or materials are applied across the entire span of the filter assembly to either or both filters in order to treat all of the air flowing through the filter assembly. However, a scent may be applied to only a portion of either or both filter elements, as the scent will mix with the unscented air passing through the balance of the filter elements. Alternatively, one or more of the air treatment materials may be used to impregnate a separate porous air treatment sheet, which is, in turn, placed across the inlet surface of the inlet side air filter element. It is also possible to apply one or more of such air treatment agents or materials to either or both of the filter elements and apply one or more air treatment agents or materials to the separate air treatment sheet prior to or after its assembly with the filter assembly as the frame is installed.

In conclusion, the two-stage air filter assembly in its various embodiments provides numerous advantages over previously developed filters. The dual-stage filter elements serve to capture coarser particles by means of the first or inlet side filter (i.e., the return side filter in a closed HVAC system), thus precluding premature blockage of the finer secondary or outlet side filter element. This results in a filter assembly having greater replacement intervals, thus providing greater economy for the user. The elimination of any filter element securing means or structure across the span of the two filter elements further optimizes efficiency. The optional blowout guard and/or addition of various air treatment agents or materials provide even greater versatility for the two-stage air filter assembly. Accordingly, the two-stage filter assembly will prove to be a most useful feature in virtually any stationary structure or motor vehicle HVAC system, and/or various stationary and motor vehicle internal combustion engine induction systems as well, depending upon the specific filter configuration.

As shown in FIGS. 4 and 5, the two-stage filter may be incorporated into a surgical mask or any other breathing apparatus that provides filtered air to the user. Mask 200 is shown for exemplary purposes only, and it should be understood that the two-stage filter may be used with any desired style or configuration of mask or breathing apparatus. As shown, an inner filter material layer 204 is provided, as is conventionally known. Inner filter material layer 204 is formed from porous fabric or the like of the type commonly used in surgical masks. Any suitable material may be used.

The outlet surface of the outlet side filter layer 14 is positioned opposite the inner face of the outer, filter material layer 204, facing outwardly. Inlet side filter layer 12 is sandwiched between the outlet side filter layer 14 and the filter material layer 204. Inlet side filter layer 12 may be attached to the outer face of outer, filter material layer 204 by any suitable type of attachment, such as stitching or the like. As described above, the inlet side filter layer 12 and the outlet side filter layer 14 each have a mutually contiguous periphery and an adjacent filter layer contact face, forming a continuous, unbroken, homogeneous contact interface therebetween. The inlet side filter layer 12 is attached to the outlet side filter layer 14 via any suitable type of attachment, as described in detail above.

Additionally, the mask 200 includes straps 202 or the like for securing the mask 200 to the user's face in a conventional manner. As described above, with specific reference to FIG. 1, a retainer or guard, similar to retainer 40, may be added adjacent the inlet and/or outlet surfaces. In FIGS. 4 and 5, a surgical mask is shown for exemplary purposes only, allowing the air breathed out by a surgeon, for example, to be filtered, to avoid contaminating the sterile surgical area, with inlet side filter layer 12 being positioned closest to the surgeon's mouth. Alternatively, the mask may be used to filter contaminants from the environment, preventing these contaminants from being breathed in by the user. In this arrangement, inlet side filter layer 12 and outlet side filter layer 14 would be reversed, with outlet side filter layer 14 being sandwiched between inlet side filter layer 12 and the material layer 204.

It is to be understood that the present invention is not limited to the embodiments described above, but encompasses any and all embodiments within the scope of the following claims.

We claim:

1. A two-stage air filter, comprising:
   an inlet side filter element, the inlet side filter element having an inlet surface, wherein the inlet side filter element is formed from a nonwoven glass fiber material;
   an outlet side filter element of nonwoven fiber material and having an outlet surface, the outlet side filter element having a finer gauge than the inlet side filter element, wherein the outlet side filter layer is formed of materials selected from the group consisting of polyester fibers and polyester/cotton fiber blends, the inlet side filter element and the outlet side filter element each having a mutually contiguous periphery and an adjacent filter element contact face forming a continuous, unbroken, homogeneous contact interface therebetween;
   a porous fabric sheet being disposed across the inlet surface of the inlet side filter element and being configured for positioning adjacent the mouth and nose of a user;
   a filter element retainer disposed across an exterior face of the porous sheet; and
   a frame disposed about the periphery of each of the filter elements, the filter element retainer and the porous sheet, the frame securing the filter elements together.

2. A two-stage air filter as recited in claim 1, wherein the frame has an inlet side peripheral flange and an outlet side peripheral flange opposite the inlet side peripheral flange, the inlet side peripheral flange being adhesively attached to the inlet side filter element about the periphery thereof, the outlet side peripheral flange being adhesively attached to the outlet side filter element about the periphery thereof.

3. A two-stage air filter as recited in claim 1, wherein the frame has an inlet side peripheral flange and an outlet side peripheral flange opposite the inlet side peripheral flange, the inlet side peripheral flange being secured to the inlet side filter element about the periphery thereof, the outlet side peripheral flange being secured to the outlet side filter element about the periphery thereof.

4. A two-stage air filter as recited in claim 1, further including at least one air treatment material disposed across at least a portion of at least one of the filter elements.

5. A two-stage air filter as recited in claim 1, further including a porous sheet impregnated with the air treatment material, the sheet being disposed across the inlet surface of the inlet side filter element.

6. A two-stage air filter as recited in claim 4, wherein the at least one air treatment material is selected from the group consisting of air freshening and cleaning, deodorizing, odor neutralizing, scent applying, fungicidal, bactericidal, and germicidal materials.

7. A two-stage air filter as recited in claim 5, wherein the at least one air treatment material is selected from the group consisting of air freshening and cleaning, deodorizing, odor neutralizing, scent applying, fungicidal, bactericidal, and germicidal materials.

8. A two-stage air filter as recited in claim 1, wherein the frame is formed of materials selected from the group consisting of heavy paper, cardboard, plastic, and metal.

* * * * *